US011949165B2

(12) United States Patent
Hirabe et al.

(10) Patent No.: US 11,949,165 B2
(45) Date of Patent: *Apr. 2, 2024

(54) ANTENNA DEVICE AND COMMUNICATION METHOD

(71) Applicant: NEC Corporation, Tokyo (JP)

(72) Inventors: Masashi Hirabe, Tokyo (JP); Tetsuo Yama, Tokyo (JP); Hiroki Takeda, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 391 days.

This patent is subject to a terminal disclaimer.

(21) Appl. No.: 17/299,060

(22) PCT Filed: Dec. 10, 2019

(86) PCT No.: PCT/JP2019/048294

§ 371 (c)(1),
(2) Date: Jun. 2, 2021

(87) PCT Pub. No.: WO2020/122070

PCT Pub. Date: Jun. 18, 2020

(65) Prior Publication Data

US 2022/0069481 A1 Mar. 3, 2022

(30) Foreign Application Priority Data

Dec. 12, 2018 (JP) ................................. 2018-232935

(51) Int. Cl.
*H01Q 21/24* (2006.01)
*H01Q 9/04* (2006.01)
*H01Q 25/00* (2006.01)

(52) U.S. Cl.
CPC ........... *H01Q 21/24* (2013.01); *H01Q 9/0407* (2013.01); *H01Q 25/005* (2013.01)

(58) Field of Classification Search
CPC .... H01Q 21/24; H01Q 25/005; H01Q 9/0407; H01Q 21/065
See application file for complete search history.

(56) References Cited

U.S. PATENT DOCUMENTS 10,025,960 B1 * 7/2018 Fink .......................... H04L 5/08
2002/0175862 A1 11/2002 Hunter et al.
(Continued)

FOREIGN PATENT DOCUMENTS

CA 2373645 A1 9/2002
JP H01-151325 A 6/1989
(Continued)

OTHER PUBLICATIONS

Japanese Office Action for JP Application No. 2018-232935, dated Dec. 6, 2022 with English Translation.
(Continued)

*Primary Examiner* — Hasan Islam
(74) *Attorney, Agent, or Firm* — Sughrue Mion, PLLC

(57) ABSTRACT

An antenna device according to the present disclosure includes a first antenna that is oriented in a first direction and transmits and receives a signal with a first polarization, a second antenna that is oriented in a second direction opposite to the first direction, a third antenna that is oriented in a third direction obtained by horizontally rotating the second direction by 90° or 180° and transmits and receives a signal with a second polarization orthogonal to the first polarization, a fourth antenna that is oriented in a fourth direction opposite to the third direction and transmits and receives a signal with the second polarization. The second antenna is provided with a feeding point placed in phase with a feeding point of the first antenna. The fourth antenna is provided with a feeding point placed in opposite phase to a feeding point of the third antenna.

2 Claims, 9 Drawing Sheets

(56) References Cited

U.S. PATENT DOCUMENTS

| | | | | |
|---|---|---|---|---|
| 2010/0103052 | A1 | 4/2010 | Ying | |
| 2013/0106671 | A1* | 5/2013 | Eom | H01Q 21/29 343/893 |
| 2013/0257680 | A1 | 10/2013 | Nix et al. | |
| 2017/0222333 | A1* | 8/2017 | Sudo | H01Q 1/38 |

FOREIGN PATENT DOCUMENTS

| | | | |
|---|---|---|---|
| JP | H05175727 | A | 7/1993 |
| JP | H07-046028 | A | 2/1995 |
| JP | H09219618 | A | 8/1997 |
| JP | 2015097338 | A | 5/2015 |
| WO | 2010046144 | A1 | 4/2010 |
| WO | 2012004602 | A1 | 1/2012 |

OTHER PUBLICATIONS

International Search Report of PCT Application No. PCT/JP2019/048294 dated Mar. 3, 2020.

Khojastepour et al., "The Case for Antenna Cancellation for Scalable Full-Duplex Wireless Communications", Hotnets'11, Nov. 14-15, 2011, pp. 1-6.

Aryafar et. al., "MIDU: Enabling MIMO Full Duplex" MobiCom'12, Aug. 22-26, 2012, pp. 257-268.

* cited by examiner

ANTENNA DEVICE AND COMMUNICATION METHOD

This application is a National Stage Entry of PCT/JP2019/048294 filed on Dec. 10, 2019, which claims priority from Japanese Patent Application 2018-232935 filed on Dec. 12, 2018, the contents of all of which are incorporated herein by reference, in their entirety.

TECHNICAL FIELD

The present disclosure relates to an antenna device and communication method.

BACKGROUND ART

Technologies using a plurality of antennas for FD (Full Duplex) communication or MIMO (Multiple Input and Multiple Output) communication are disclosed in Non-patent literatures 1 and 2. In these literatures, loop interference signals of antennas are cancelled in a plurality of phases.

CITATION LIST

Patent Literature

Non Patent Literature 1: Mohammad A. Khojastepour, et. al., "The Case for Antenna Cancellation for Scalable Full-Duplex Wireless Communications", Hotnets '11, Nov. 14-15, 2011, Cambridge, MA, USA.

Non Patent literature 2: Ehsan Aryafar, et. al., "MIDU: Enabling MIMO Full Duplex", MobiCom'12, Aug. 22-26, 2012, Istanbul, Turkey.

SUMMARY OF INVENTION

Technical Problem

In a full duplex radio communication device or a radio relay device, a receiving antenna receives a signal while a transmitting antenna transmits a signal. When the frequencies of transmission and reception are the same or close, loop interference from transmission to reception occurs. Specifically, a radio wave emitted from a transmitting antenna serves as interference on the receiving side, which causes the degradation of reception characteristics. Further, there is sometimes a demand for omni-directionality in order to ensure the flexibility of installation of radio communication equipment.

An object of the present disclosure is to provide an antenna device and a communication method with omni-directionality and good reception characteristics.

Solution to Problem

An antenna device according to the present disclosure includes a first directional antenna oriented in a first direction and configured to transmit and receive a signal with a first polarization; a second directional antenna oriented in a second direction opposite to the first direction and configured to transmit and receive a signal with the first polarization; a third directional antenna oriented in a third direction obtained by horizontally rotating the second direction by 90° or 180° and configured to transmit and receive a signal with a second polarization orthogonal to the first polarization; a fourth directional antenna oriented in a fourth direction opposite to the third direction and configured to transmit and receive a signal with the second polarization; a first feeding point provided in the first directional antenna; a second feeding point provided in the second directional antenna and placed in phase with the first feeding point; a third feeding point provided in the third directional antenna; a fourth feeding point provided in the fourth directional antenna and placed in opposite phase to the third feeding point.

A communication method according to the present disclosure includes a step of performing one of transmission and reception by using a first directional antenna provided with a first feeding point and a second directional antenna provided with a second feeding point; a step of performing another one of transmission and reception by using a third directional antenna provided with a third feeding point and a fourth directional antenna provided with a fourth feeding point; and wherein the first directional antenna and the second directional antenna transmit and receive a signal with a first polarization, the third directional antenna and the fourth directional antenna transmit and receive a signal with a second polarization orthogonal to the first polarization, the first directional antenna is oriented in a first direction, the second directional antenna is oriented in a second direction opposite to the first direction, the third directional antenna is oriented in a third direction obtained by horizontally rotating the second direction by 90° or 180°, the fourth directional antenna is oriented in a fourth direction opposite to the third direction, the first feeding point and the second feeding point are placed in phase with each other, and the third feeding point and the fourth feeding point are placed in opposite phase to each other.

Advantageous Effects of Invention

According to the present disclosure, it is intended to provide an antenna device and a communication method with omni-directionality and good reception characteristics.

DESCRIPTION OF EMBODIMENTS

Example embodiments of the present disclosure will be described hereinafter with reference to the drawings. In the figures, the identical reference symbols denote identical structural elements and the redundant explanation thereof is omitted.

An antenna device according to this example embodiment is to be used for a radio relay device for femtocell communications, for example. The radio relay device has both the function of communicating with a terminal and the function of communicating with a base station. Thus, there is a case where the radio relay device transmits a radio signal to a terminal and simultaneously receives a radio signal from a base station. There is also a case where the radio relay device transmits a radio signal to a base station and simultaneously receives a radio signal from a terminal. In such cases, a transmission signal can come to the receiving side, which causes the degradation of the reception characteristics.

An antenna device of a communication device preferably has omni-directionality. In other words, the antenna device preferably covers an azimuth of 0° to 360°. For example, in the case of an antenna device without omni-directionality, the angle and direction of installation are restricted. On the other hand, if an antenna device has omni-directionality, radio communication is achieved regardless of the angle of installation. Particularly, an antenna device that is installed as a radio relay station at home or the like is required to have omni-directionality. In this example embodiment, an antenna device having omni-directionality and capable of reducing the degradation of reception characteristics due to loop interference is provided.

First Example Embodiment

Figure 1:
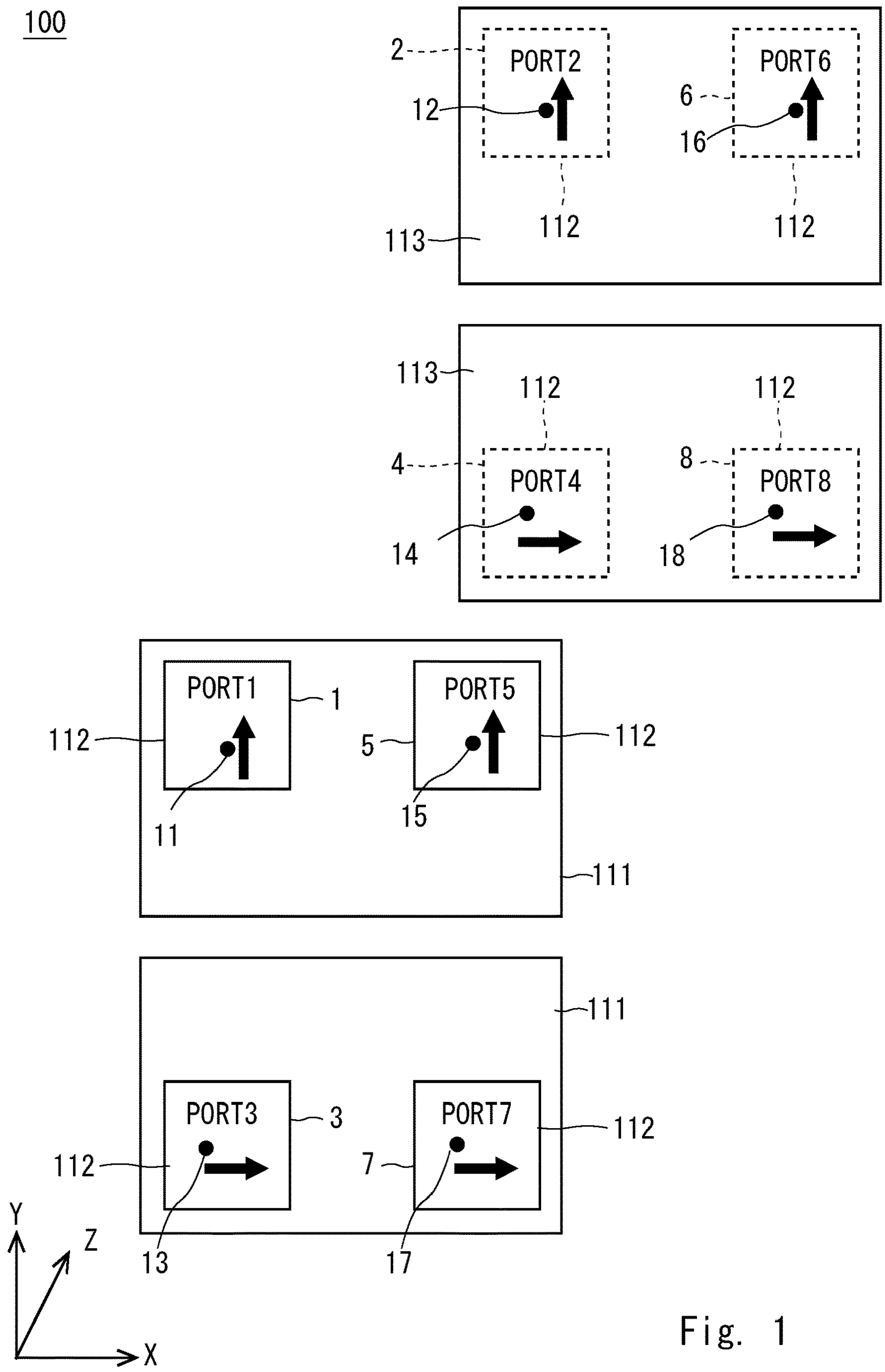
FIG. 1 is a view schematically showing the structure of an antenna device.

The structure of an antenna device that is used for a communication device according to a first example embodiment is described hereinafter with reference to FIG. 1. FIG. 1 is a perspective view schematically showing the structure of an antenna device 100. The following description is based on the assumption that the antenna device 100 is used for a radio relay station having the function of communicating with a base station and the function of communicating with a terminal. FIG. 1 shows an XYZ three-dimensional orthogonal coordinate system to clarify the description. For example, the Y direction is a vertical direction, and the XZ plane is a horizontal plane.

A direction in the XZ plane is an azimuth.

The antenna device 100 includes a first antenna 1 to an eighth antenna 8. The first antenna 1 to the eighth antenna 8 are patch antennas with directivity. The first antenna 1 to the eighth antenna 8 include a front conductor 112 and a back conductor 113 formed on a dielectric substrate 111. The structure of the patch antenna is described later.

The patch antenna has directivity according to the orientation of a radiating element, which is, the orientation of the front conductor 112. The first antenna 1 to the eighth antenna 8 are planar antennas in a flat shape. The first antenna 1 to the eighth antenna 8 are placed parallel to the XY plane.

The first antenna 1, the second antenna 2, the fifth antenna 5 and the sixth antenna 6 are antennas for communication with a base station. By using the first antenna 1, the second antenna 2, the fifth antenna 5 and the sixth antenna 6, radio communication with a base station is achieved. The third antenna 3, the fourth antenna 4, the seventh antenna 7 and the eighth antenna 8 are antennas for communication with a terminal. By using the third antenna 3, the fourth antenna 4, the seventh antenna 7 and the eighth antenna 8, radio communication with a terminal is achieved.

The first antenna 1, the second antenna 2, the fifth antenna 5 and the sixth antenna 6 transmit and receive radio signals of V polarization (vertical polarization). The third antenna 3, the fourth antenna 4, the seventh antenna 7 and the eighth antenna 8 transmit and receive radio signals of H polarization (horizontal polarization).

The first antenna 1, the third antenna 3, the fifth antenna 5 and the seventh antenna 7 are placed on the same XY plane. Thus, the Z positions of the first antenna 1, the third antenna 3, the fifth antenna 5 and the seventh antenna 7 are the same. The first antenna 1, the third antenna 3, the fifth antenna 5 and the seventh antenna 7 are oriented in the −Z direction. The first antenna 1, the third antenna 3, the fifth antenna 5 and the seventh antenna 7 have directivity in the azimuth direction around the −Z axis direction.

Likewise, the second antenna 2, the fourth antenna 4, the sixth antenna 6 and the eighth antenna 8 are placed on the same XY plane. Thus, the Z positions of the second antenna 2, the fourth antenna 4, the sixth antenna 6 and the eighth antenna 8 are the same. The second antenna 2, the fourth antenna 4, the sixth antenna 6 and the eighth antenna 8 are oriented in the +Z direction. The second antenna 2, the fourth antenna 4, the sixth antenna 6 and the eighth antenna 8 have directivity in the azimuth direction around the +Z axis direction.

For example, it is assumed that the first antenna 1, the third antenna 3, the fifth antenna 5 and the seventh antenna 7 have sensitivity in the azimuth range of 0° to 180°, and the second antenna 2, the fourth antenna 4, the sixth antenna 6 and the eighth antenna 8 have sensitivity in the azimuth range of 180° to 360°.

The first antenna 1 and the second antenna 2 are placed facing in opposite directions. A received signal of the first antenna 1 and a received signal of the second antenna 2 are to be combined. Further, a transmission signal is to branch off and to be emitted from the first antenna 1 and the second antenna 2. The first antenna 1 and the second antenna 2 that are oriented in opposite directions to each other form a pair and achieve omni-directionality. A pair of the first antenna 1 and the second antenna 2 is referred to as a first pair. The first antenna 1 and the second antenna 2 are placed so as to overlap each other in the XY plane. The positions of the first antenna 1 and the second antenna 2 in the XY plane correspond to each other.

The third antenna 3 and the fourth antenna 4 are placed facing in opposite directions. The third antenna 3 and the fourth antenna 4 form a pair. A pair of the third antenna 3 and the fourth antenna 4 is referred to as a second pair. A received signal of the third antenna 3 and a received signal of the fourth antenna 4 are to be combined. Further, a transmission signal is to branch off and to be emitted from the third antenna 3 and the fourth antenna 4. A feeding point 13 of the third antenna 3 and a feeding point 14 of the fourth antenna 4 are placed at positions that are mirror images of each other. The third antenna 3 and the fourth antenna 4 that are oriented in opposite directions to each other form a pair and achieve omni-directionality. The third antenna 3 and the fourth antenna 4 are placed so as to overlap each other in the XY plane. The positions of the third antenna 3 and the fourth antenna 4 in the XY plane correspond to each other. The third antenna 3 is oriented in the direction where the direction of the second antenna 2 is rotated by 180° in the horizontal direction (about the Y axis).

The fifth antenna 5 and the sixth antenna 6 are placed facing in opposite directions. The fifth antenna 5 and the sixth antenna 6 form a pair. A pair of the fifth antenna 5 and the sixth antenna 6 is referred to as a third pair. A received signal of the fifth antenna 5 and a received signal of the sixth antenna 6 are to be combined. Further, a transmission signal is to branch off and to be emitted from the fifth antenna 5 and the sixth antenna 6. The fifth antenna 5 and the sixth antenna 6 that are oriented in opposite directions to each other form a pair and achieve omni-directionality. The fifth antenna 5 and the sixth antenna 6 are placed so as to overlap each other in the XY plane. The positions of the fifth antenna 5 and the sixth antenna 6 in the XY plane correspond to each other.

The seventh antenna 7 and the eighth antenna 8 are placed facing in opposite directions. The seventh antenna 7 and the eighth antenna 8 form a pair. A pair of the seventh antenna 7 and the eighth antenna 8 is referred to as a fourth pair. A received signal of the seventh antenna 7 and a received signal of the eighth antenna 8 are to be combined. Further, a transmission signal is to branch off and to be emitted from the seventh antenna 7 and the eighth antenna 8. A feeding point 17 of the seventh antenna 7 and a feeding point 18 of the eighth antenna 8 are placed at positions that are mirror images of each other. The seventh antenna 7 and the eighth antenna 8 that are oriented in opposite directions to each other form a pair and achieve omni-directionality. The seventh antenna 7 and the eighth antenna 8 are placed so as to overlap each other in the XY plane. The positions of the seventh antenna 7 and the eighth antenna 8 in the XY plane correspond to each other. The seventh antenna 7 is oriented in the direction where the direction of the eighth antenna 8 is rotated by 180° in the horizontal direction (about the Y axis).

The fifth antenna 5 is placed on the +X side of the first antenna 1. The third antenna 3 is placed on the −Y side of the first antenna 1. The seventh antenna 7 is placed on the +X side of the third antenna 3 and on the −Y side of the fifth antenna 5. Thus, the first antenna 1, the third antenna 3, the fifth antenna 5 and the seventh antenna 7 are arranged in a 2×2 array on the same XY plane. Likewise, the second antenna 2, the fourth antenna 4, the sixth antenna 6 and the eighth antenna 8 are arranged in a 2×2 array on the same XY plane.

The first antenna 1 has a feeding point 11. The feeding point 11 is to feed power to the first antenna 1. Likewise, the second antenna 2 to the eighth antenna 8 have feeding points 12 to 18, respectively. The feeding points 12 to 18 are to feed power to the second antenna 2 to the eighth antenna 8, respectively.

When an adjacent antenna is located nearby, there is a possibility that a transmission signal comes to the receiving side, causing interference. A structure to reduce the interference is described hereinbelow.

The XY positions of feeding points of a pair of two antennas correspond to each other. For example, when viewed in the XY plane, the feeding point 11 of the first antenna 1 and the feeding point 12 of the second antenna 2 correspond to each other. Likewise, when viewed in the XY plane, the feeding point 13 of the third antenna 3 and the feeding point 14 of the fourth antenna 4 correspond to each other. When viewed in the XY plane, the feeding point 15 of the fifth antenna 5 and the feeding point 16 of the sixth antenna 6 correspond to each other. When viewed in the XY plane, the feeding point 17 of the seventh antenna 7 and the feeding point 18 of the eighth antenna 8 correspond to each other.

Figure 2:
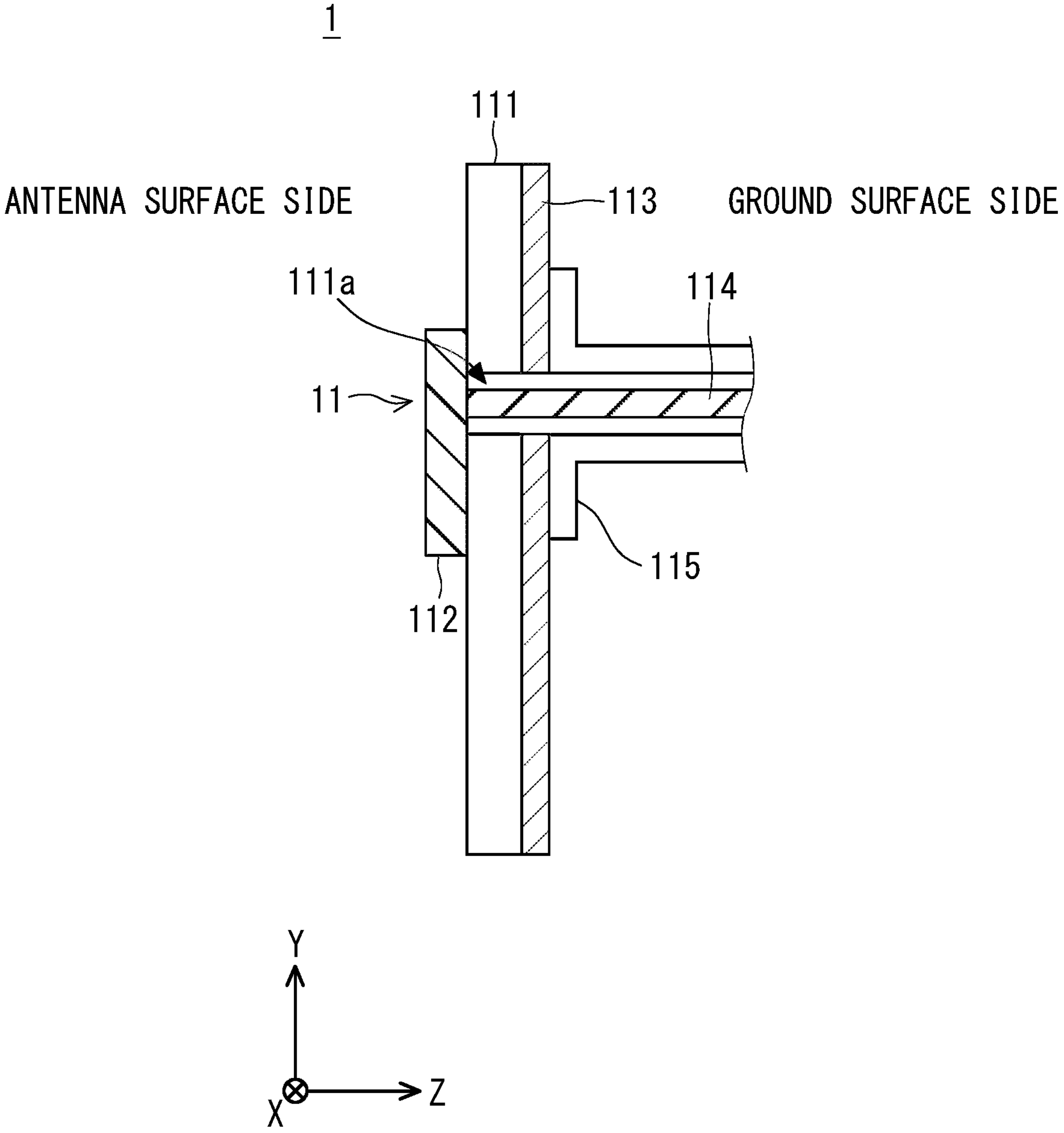
FIG. 2 is a Y-Z cross-sectional view schematically showing the structure of a patch antenna, which is a first antenna.

The structure of the patch antenna is described hereinafter. FIG. 2 is a cross-sectional view showing the structure of the first antenna 1, which is the patch antenna. To be specific, FIG. 2 shows a cross-sectional view along the YZ plane. Note that the basic structure of the second antenna 2 to the eighth antenna 8 is the same as that of the first antenna 1, and therefore detailed description thereof is omitted. The first antenna 1 includes the dielectric substrate 111, the front conductor 112, the back conductor 113, a feeder 114, and a connector 115. The connector 115 may be a coaxial cable. In this case, the coaxial cable may be connected to the front conductor 112 by soldering or the like.

The dielectric substrate 111 is a parallel flat plate made of a dielectric material such as insulating resin, for example. The front conductor 112 is formed on the −Z side surface of the dielectric substrate 111, and the back conductor 113 is formed on the +Z side surface of the dielectric substrate 111. Thus, the front conductor 112 is formed on the front surface of the dielectric substrate 111. The back conductor 113 is formed on the back surface of the dielectric substrate 111. Note that the surface on which the front conductor 112 is formed is referred to as an antenna surface side, and the surface on which the back conductor 113 is formed is referred to as a ground surface side.

The front conductor 112 and the back conductor 113 are made of a conducting material such as copper foil, for example. The front conductor 112 is a radiating element that radiates linear polarization. The front conductor 112 is a rectangular pattern with a size according to the frequency of transmission and received signals, the dielectric constant of the dielectric substrate 111 and so on. The back conductor 113 is formed almost entirely on the dielectric substrate 111 excluding the connector 115. The back conductor 113 is grounded.

The connector 115 is connected to the backside of the dielectric substrate 111. The connector 115 connects a cable (not shown) to the dielectric substrate 111. The cable is a coaxial cable, for example, and its inner conductor serves as the feeder 114. The feeder 114 reaches the front conductor 112 via a through-hole 111*a* provided on the dielectric substrate 111. The feeder 114 and the front conductor 112 are electrically connected, thereby feeding power. A connecting position of the feeder 114 to the front conductor 112 serves as the feeding point 11.

The basic structure of the second antenna 2 to the eighth antenna 8 is the same as that of the first antenna 1. The third antenna 3, the fifth antenna 5 and the seventh antenna 7 are oriented in the same direction as the first antenna 1.

Specifically, the first antenna 1, the third antenna 3, the fifth antenna 5 and the seventh antenna 7 are oriented in the −Z direction. The second antenna 2, the fourth antenna 4, the sixth antenna 6 and the eighth antenna 8 are oriented in the opposite direction to the first antenna 1. Specifically, the second antenna 2, the fourth antenna 4, the sixth antenna 6 and the eighth antenna 8 are oriented in the +Z direction. A pair of two antennas, such as the first antenna 1 and the second antenna 2 in the first pair, for example, are placed opposite to each other with their back conductors 113 facing each other.

Referring back to FIG. 1, the first antenna 1, the third antenna 3, the fifth antenna 5 and the seventh antenna 7 have an antenna surface on the −Z side. The second antenna 2, the fourth antenna 4, the sixth antenna 6 and the eighth antenna 8 have an antenna surface on the +Z side. Specifically, the antenna surfaces of the first antenna 1, the third antenna 3, the fifth antenna 5 and the seventh antenna 7 and the antenna surfaces of the second antenna 2, the fourth antenna 4, the sixth antenna 6 and the eighth antenna 8 face opposite directions. The first antenna 1, the third antenna 3, the fifth antenna 5 and the seventh antenna 7 can emit electric waves in the azimuth range of 0° to 180°. On the other hand, the second antenna 2, the fourth antenna 4, the sixth antenna 6 and the eighth antenna 8 can emit electric waves in the azimuth range of 180° to 360°. Omni-directionality is achieved by combining the first antenna 1 and the second antenna 2, the third antenna 3 and the fourth antenna 4, the fifth antenna 5 and the sixth antenna 6, and the seventh antenna 7 and the eighth antenna 8 in an appropriate phase relationship.

Note that the first antenna 1 and the fifth antenna 5 can use a common substrate as the dielectric substrate 111. Specifically, two rectangular patterns are formed on the surface of one dielectric substrate 111. Then, one rectangular pattern is used as the front conductor 112 of the first antenna 1, and the other rectangular pattern is used as the front conductor 112 of the fifth antenna 5. Likewise, the second antenna 2 and the sixth antenna 6 can use a common substrate as the dielectric substrate 111. The third antenna 3 and the seventh antenna 7 can use a common substrate as the dielectric substrate 111. The fourth antenna 4 and the eighth antenna 8 can use a common substrate as the dielectric substrate 111.

Further, four antennas oriented in the same direction may use a common substrate as the dielectric substrate 111. For example, the first antenna 1, the third antenna 3, the fifth antenna 5 and the seventh antenna 7 may use the dielectric substrate 111 in common. Further, the second antenna 2, the fourth antenna 4, the sixth antenna 6 and the eighth antenna 8 may use the dielectric substrate 111 in common.

The first antenna 1, the second antenna 2, the fifth antenna 5 and the sixth antenna 6 are used for transmitting and receiving V polarization. In the case of V polarization, the feeding point is displaced in the −Y direction from the center of the front conductor 112 when viewed in the XY plane from the antenna surface. The third antenna 3, the fourth antenna 4, the seventh antenna 7 and the eighth antenna 8 are used for transmitting and receiving H polarization. In the case of H polarization, the feeding point is displaced in the −X direction from the center of the front conductor 112 when viewed in the XY plane from the antenna surface.

The XY position of the front conductor 112 is the same between the first antenna 1 and the second antenna 2. Specifically, when viewed in the XY plane, the front conductor 112 of the first antenna 1 and the front conductor 112 of the second antenna 2 have the same size and the same shape as each other, and are placed at the same position. The front conductor 112 of the first antenna 1 and the front conductor 112 of the second antenna 2 are placed so as to overlap each other. Further, the feeding point 11 of the first antenna 1 and the feeding point 12 of the second antenna 2 are at the same XY position.

In the first antenna 1 and the second antenna 2, the feeding point 11 and the feeding point 12 are respectively displaced in the Y direction from the center of the front conductor 112 as described above in order to transmit and receive V polarization. For example, as shown in FIG. 1, the feeding point 11 and the feeding point 12 are displaced in the −Y direction from the center of the front conductor 112 when viewed in the XY plane from the −Z side. Thus, the feeding point 11 and the feeding point 12 are displaced in the −Y direction from the center of the front conductor 112 also when viewed in the XY plane from the antenna surface.

The XY position of the front conductor 112 is the same between the third antenna 3 and the fourth antenna 4. Specifically, when viewed in the XY plane, the front conductor 112 of the third antenna 3 and the front conductor 112 of the fourth antenna 4 have the same size and the same shape as each other, and are placed at the same position. Further, the feeding point 13 of the third antenna 3 and the feeding point 14 of the fourth antenna 4 are at the same XY position.

In the third antenna 3 and the fourth antenna 4, the feeding point 13 and the feeding point 14 are respectively displaced in the X direction from the center of the front conductor 112 in order to transmit and receive H polarization. As shown in FIG. 1, the feeding point 13 and the feeding point 14 are displaced in the −X direction from the center of the front conductor 112 when viewed in the XY plane from the −Z side. Thus, the feeding point 13 and the feeding point 14 are displaced in opposite directions from the center of the front conductor 112 when viewed in the XY plane from the antenna surface. For example, when viewed in the XY plane from the antenna surface side (−Z side) of the third antenna 3, the feeding point 13 is displaced to the left from the center of the front conductor 112. When viewed in the XY plane from the antenna surface side (+Z side) of the fourth antenna 4, the feeding point 14 is displaced to the right from the center of the front conductor 112. The distance of displacement of the feeding point 13 from the center of the front conductor 112 and the distance of displacement of the feeding point 14 from the center of the front conductor 112 are the same.

Therefore, signals are in phase in a pair of antennas with V polarization, and signals are in opposite phase in a pair of antennas with H polarization. Specifically, the first antenna 1 and the second antenna 2 transmit signals in the same phase. The third antenna 3 and the fourth antenna 4 transmit signals in phases shifted by 180°. The feeding point 12 is placed to be in phase with the feeding point 11, and the feeding point 14 is placed to be in the opposite phase to the feeding point 13.

Note that the positional relationship between the feeding point 15 of the fifth antenna 5 and the feeding point 16 of the sixth antenna 6 is the same as the positional relationship between the feeding point 11 and the feeding point 12. Thus, transmission signals are in phase in the fifth antenna 5 and the sixth antenna 6. The positional relationship between the feeding point 17 of the seventh antenna 7 and the feeding point 18 of the eighth antenna 8 is the same as the positional relationship between the feeding point 13 and the feeding point 14. Thus, transmission signals are transmitted in opposite phase in the seventh antenna 7 and the eighth antenna 8.

The loop interference of a transmission signal is described hereinafter. The state where the second pair of the third antenna 3 and the fourth antenna 4 receives signals while the first pair of the first antenna 1 and the second antenna 2 transmits signals is described first.

The first antenna 1 and the second antenna 2 transmit a common transmission signal to achieve omni-directionality. Specifically, the transmission signal branches off at a distributor and is emitted from the first antenna 1 and the second antenna 2. Transmission signals transmitted from the first antenna 1 and the second antenna 2 are in phase.

The positional relationship between the third antenna 3 and the first antenna 1 corresponds to the positional relationship between the fourth antenna 4 and the second antenna 2. Likewise, the positional relationship between the fourth antenna 4 and the first antenna 1 corresponds to the positional relationship between the third antenna 3 and the second antenna 2. Since the positional relationship of the first antenna 1 to the fourth antenna 4 has symmetry, the amplitude of interference components caused by the loop interference is the same between two antennas in a pair. Specifically, when the first pair performs one of transmission and reception and the second pair performs the other one, the same level of interference occurs in two antennas included in a pair on the receiving side.

Further, as described above, transmission signals transmitted from the first antenna 1 and the second antenna 2 are in phase. The antenna device 100 combines a received signal received by the third antenna 3 and a received signal received by the fourth antenna 4 in opposite phase. This cancels the loop interference of a transmission signal. Specifically, although interference component is generated in both a received signal of the third antenna 3 and a received signal of the fourth antenna 4 due to the loop interference of a transmission signal, two interference components cancel out each other by combining in opposite phases. For example, a received signal of the third antenna 3 contains an interference component caused by a transmission signal of the first antenna 1, and a received signal of the fourth antenna 4 contains an interference component caused by a transmission signal of the second antenna 2, and these signals are in phase. By combining the received signal of the third antenna 3 and the received signal of the fourth antenna 4 in opposite phase, the interference components cancel out each other. Likewise, the received signal of the third antenna 3 contains an interference component caused by a transmission signal of the second antenna 2, and the received signal of the fourth antenna 4 contains an interference component caused by a transmission signal of the first antenna 1, and these signals are in phase. By combining the received signal of the third antenna 3 and the received signal of the fourth antenna 4 in opposite phase, the interference components cancel out each other. The loop interference of a transmission signal is thereby cancelled. This improves the reception characteristics of the antenna device 100. This also increases the transmission output because of cancelling the loop interference.

Although the loop interference that occurs when the first pair transmits a transmission signal is described above, the loop interference that occurs when another pair transmits a transmission signal can be cancelled in the same manner. For example, when the third pair transmits a transmission signal also, the positional relationship between the third antenna 3 and the fifth antenna 5 and the positional relationship between the fourth antenna 4 and the sixth antenna 6 are the same. The positional relationship between the third antenna 3 and the sixth antenna 6 and the positional relationship between the fourth antenna 4 and the fifth antenna 5 are the same. Since the four antennas are placed symmetrically, the loop interference of a transmission signal on the receiving side is cancelled.

Next, the state where the first pair receives signals while the second pair transmits signals is described. The positional relationship between the third antenna 3 and the first antenna 1 and the positional relationship between the fourth antenna 4 and the second antenna 2 are the same. The positional relationship between the fourth antenna 4 and the first antenna 1 and the positional relationship between the third antenna 3 and the second antenna 2 are the same.

By the positional relationship between the feeding point 13 and the feeding point 14, transmission signals are in opposite phase between the third antenna 3 and the fourth antenna 4. Thus, a received signal received by the first antenna 1 and a received signal received by the second antenna 2 are combined in phase. The loop interference of a transmission signal is thereby cancelled. Specifically, the loop interference component generated in the received signal of the first antenna 1 and the loop interference component generated in the received signal of the second antenna 2 cancel out each other. The loop interference of a transmission signal is thereby cancelled.

Note that a pair on the transmitting side and a pair on the receiving side can be changed as appropriate as long as the directions of polarization on the transmitting side and the receiving side are orthogonal.

Specifically, any one of the first to fourth pairs may be used on the transmitting side, another one whose direction of polarization is orthogonal to that of the pair on the transmitting side may be used on the receiving side.

In the above-described positional relationships, the loop interference of a transmission signal is cancelled.

Further, the antenna device 100 is applicable also to repeater communication using a plurality of antennas on each of the transmitting side and the receiving side, full duplex communication, and so on.

Figure 3:
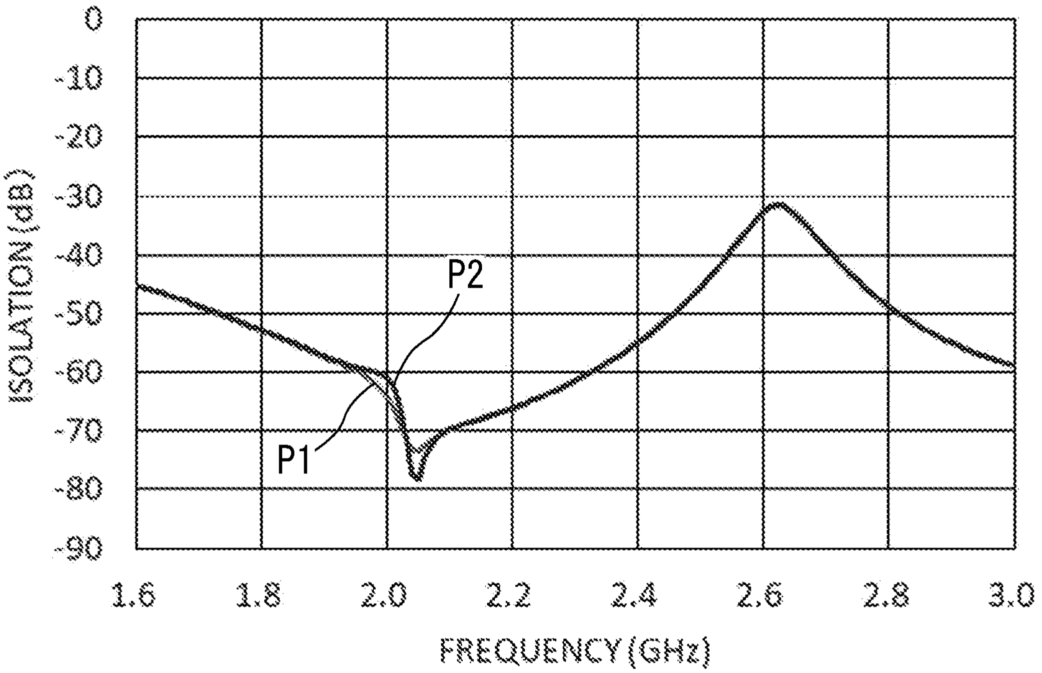
FIG. 3 is a view showing isolation characteristics in one antenna.

FIG. 3 is a view showing a simulation result of the loop interference on the receiving side. In FIG. 3, when transmitting a transmission signal from the first antenna 1 and the second antenna 2, isolation characteristics in the third antenna 3 is P1, and isolation characteristics in the fourth antenna 4 is P2, for example.

Note that the antenna device 100 is designed at a frequency of 2.6 GHz (example). A design frequency may be set arbitrarily.

Figure 4:
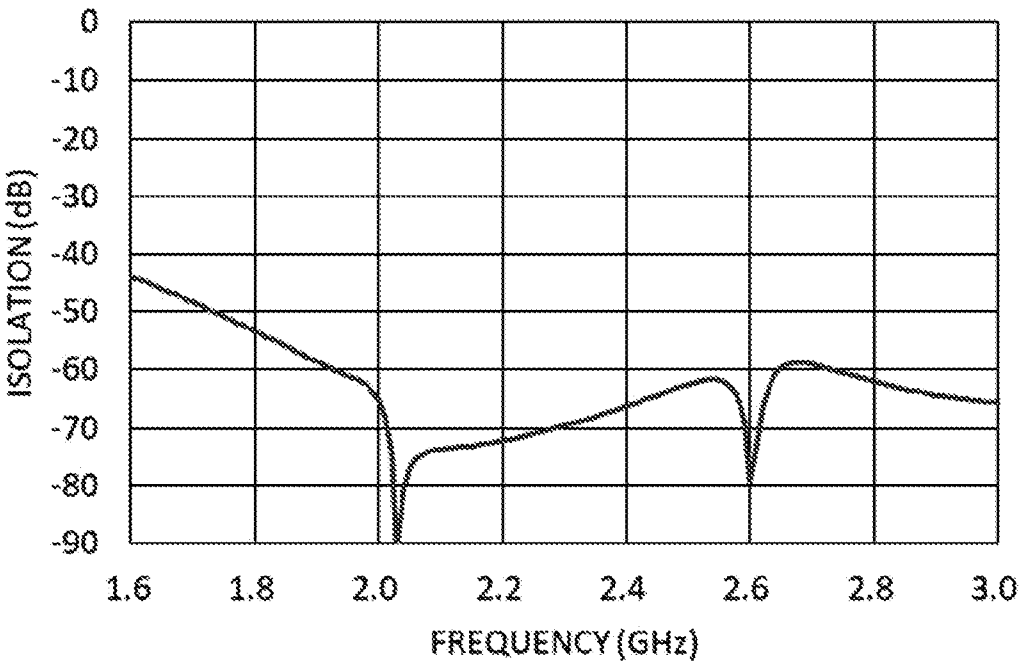
FIG. 4 is a view showing isolation characteristics in the case of combining received signals of two antennas at opposite phases.

FIG. 4 shows a simulation result of isolation characteristics in the case where received signals by the second pair are combined in opposite phase. As shown in FIG. 4, high isolation characteristics are obtained at a design frequency of 2.6 GHz (example). A design frequency may be set arbitrarily. Thus, in this example embodiment, the loop interference of a transmission signal is reduced with a simple structure. This allows an increase in transmission output.

Figure 5:
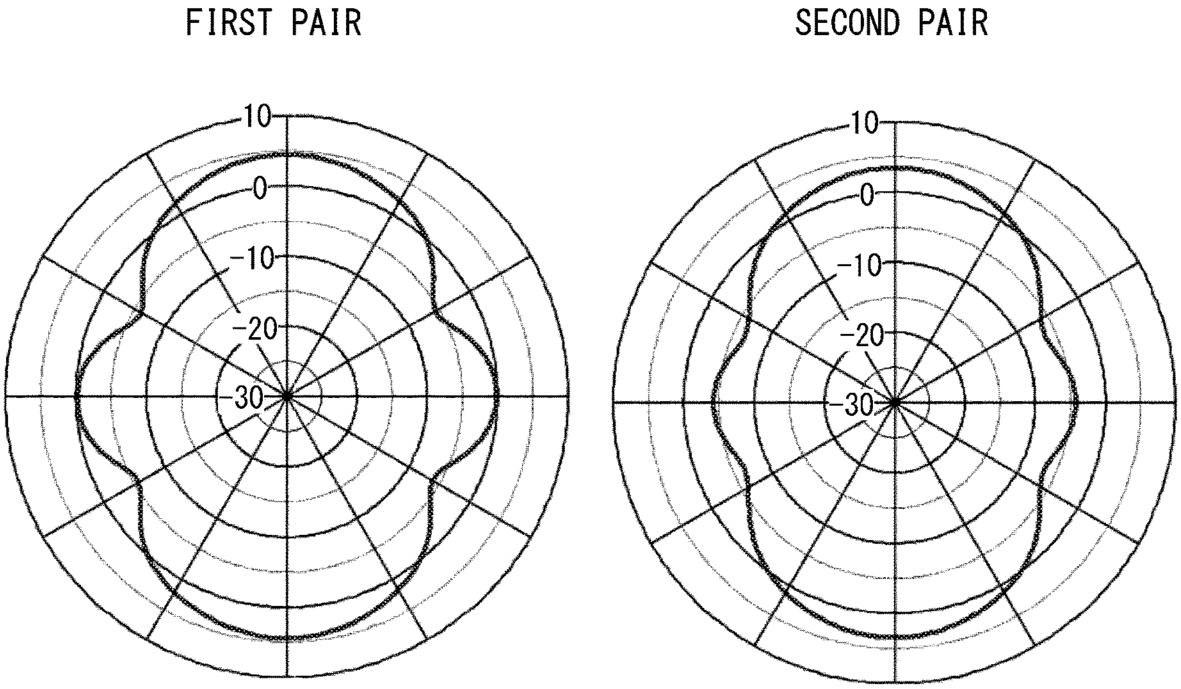
FIG. 5 is a view showing a simulation result of the azimuth directivity of an antenna device.

FIG. 5 is a view showing a simulation result of the azimuth directivity of an antenna device. An antenna pattern of the first pair (or the third pair) is shown in the left part of FIG. 5. An antenna pattern of the second pair (or the fourth pair) is shown in the right part of FIG. 5. As shown in FIG. 5, the both pairs have good omni-directionality. Thus, according to this example embodiment, omni-directionality is achieved with a simple structure. Flexibility in installation angle, direction and so on is thereby enhanced.

Although the antenna device 100 includes four pairs of (i.e., eight) antennas in the above description, the number of antennas is not particularly limited. To be specific, the antenna device 100 includes at least two pairs, such as the first antenna 1 to the fourth antenna 4, for example. The loop interference is thereby suppressed even when transmission and reception are performed simultaneously.

Figure 6:
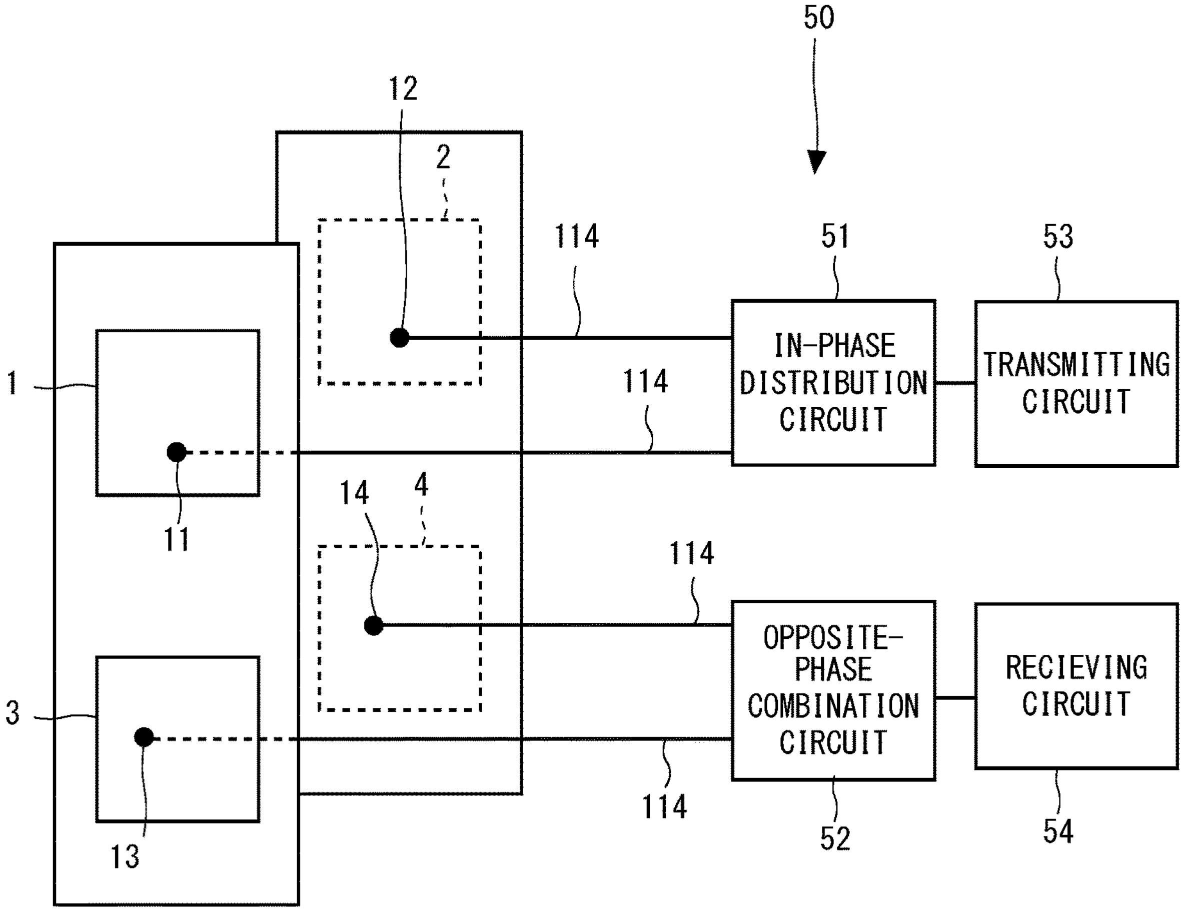
FIG. 6 is a block diagram showing a communication circuit used in the antenna device according to an example embodiment.

A communication circuit that is used for the antenna device 100 is described hereinafter with reference to FIG. 6. FIG. 6 is a view schematically showing the configuration of a communication circuit 50 implemented in the antenna device 100. The communication circuit 50 includes an in-phase distribution circuit 51, an opposite-phase combination circuit 52, a transmitting circuit 53 and a receiving circuit 54.

The in-phase distribution circuit 51 is connected to the first antenna 1 and the second antenna 2 via a feeder 114. The in-phase distribution circuit 51 is connected to the transmitting circuit 53. The transmitting circuit 53 outputs the modulated analog transmission/reception signal to the in-phase distribution circuit 51. The in-phase distribution circuit 51 branches a transmission signal from the transmitting circuit 53 and feeds the signals to the first antenna 1 and the second antenna 2 in phase. To be specific, the in-phase distribution circuit 51 splits the transmission signal at a ratio of 1:1 and feeds the signals to the first antenna 1 and the second antenna 2. An analog distributor can be used as the in-phase distribution circuit 51.

The opposite-phase combination circuit 52 is connected to the third antenna 3 and the fourth antenna 4 via a feeder 114. A received signal from the third antenna 3 and a received signal from the fourth antenna 4 are input to the opposite-phase combination circuit 52. The opposite-phase combination circuit 52 combines the two received signals in the opposite phase. To be specific, the opposite-phase combination circuit 52 includes a delay circuit which gives a delay time corresponding to 180° of the radio frequency. Further, the opposite-phase combination circuit 52 includes an analog combiner. The opposite-phase combination circuit 52 delays one received signal, and then combines the two received signal. The opposite-phase output the combined received signal to the receiving circuit 54. The receiving circuit 54 demodulates the received signal.

By using the analog communication circuit as described above, the loop interference is reduced with a simple structure. As for the fourth pair, a circuit similar to the opposite-phase combination circuit 52 of the second pair can be used. As for the combination circuit of the third pair, an in-phase combination circuit which does not include a delay circuit similar to that of the first pair.

Second Example Embodiment

Figure 7:
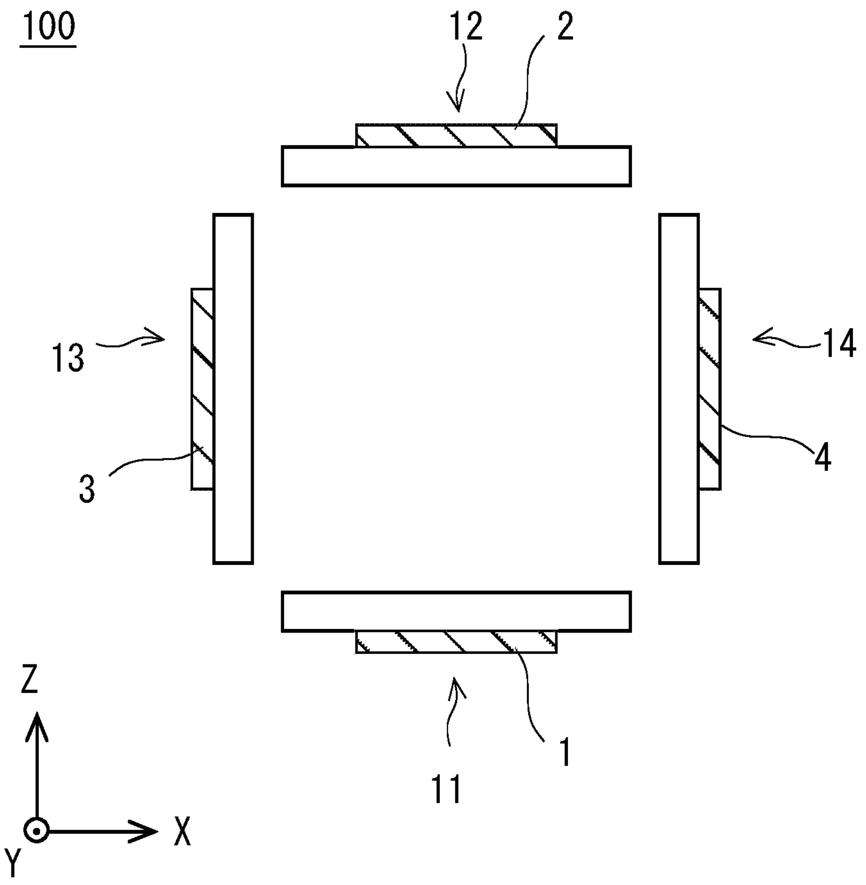
FIG. 7 is a block diagram showing antenna configurations of the antenna device according to the second embodiment.
Figure 8:
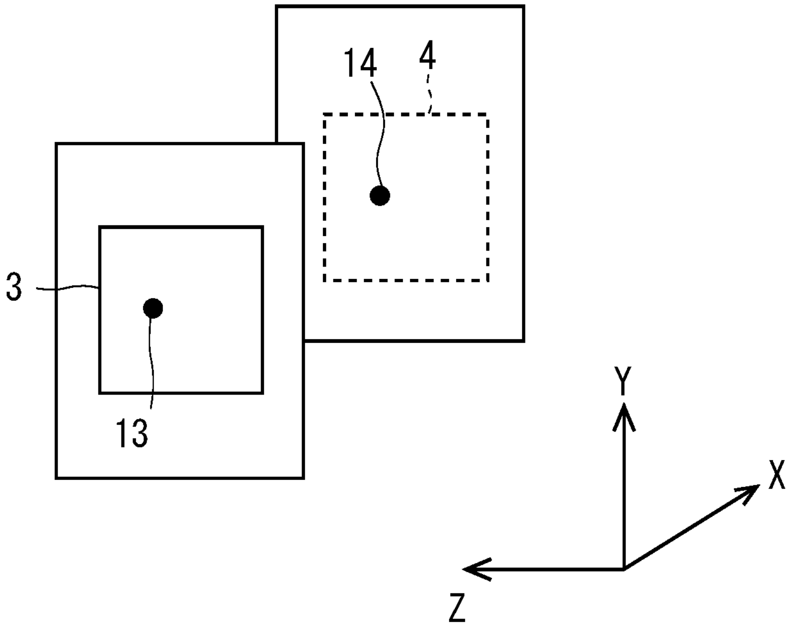
FIG. 8 is a perspective view schematically showing configurations of a third antenna 3 and fourth antenna 4.

The antenna device according to a second example embodiment is described hereinafter with reference to FIGS. 7 and 8. FIG. 7 is an XZ plan view schematically showing the arrangement of the first antenna 1 to the fourth antenna 4. FIG. 8 is a perspective view showing the arrangement of the third antenna 3 and the fourth antenna 4. In the second example embodiment, the structures of the third antenna 3 and the fourth antenna 4 are different from those in the first example embodiment. In the antenna device 100 according to the second example embodiment, the structures of the first antenna 1 and the second antenna 2 are the same as those in the first embodiment. Thus, the illustration of the first antenna 1 and the second antenna 2 is omitted in FIG. 9.

Compared with the first example embodiment, the angle of installation of the third antenna 3 and the fourth antenna 4 is rotated horizontally by 90°.

The third antenna 3 is oriented in the −X direction, and the fourth antenna 4 is oriented in the +X direction. The third antenna 3 and the fourth antenna 4 are placed at intervals from each other in the X direction. In the X direction, the first antenna 1 and the second antenna 2 are placed between the third antenna 3 and the fourth antenna 4. In the Y direction, the positions of the first antenna 1 to the fourth antenna 4 are the same.

Just like in the first example embodiment, the first antenna 1 is oriented in the −Z direction, and the second antenna 2 is oriented in the +Z direction. In the Z direction, the third antenna 3 and the fourth antenna 4 are placed between the first antenna 1 and the second antenna 2. Thus, when viewed in the XZ plane, the first antenna 1 to the fourth antenna 4 are placed on the respective sides of a square. The direction of the third antenna 3 is rotated horizontally by 90° from the direction of the second antenna 2. Thus, when the direction which the second antenna 2 is facing is rotated about the Y axis by 90°, it is the direction which the third antenna 3 is facing. Therefore, the direction of the first pair and the direction of the second pair are different by 90°.

The positional relationship of the first antenna 1 to the fourth antenna 4 has revolution symmetry. The distance from the third antenna 3 to the first antenna 1 is equal to the distance from the fourth antenna 4 to the second antenna 2. The distance from the third antenna 3 to the second antenna 2 is equal to the distance from the fourth antenna 4 to the first antenna 1. The distance from the third antenna 3 to the first antenna 1 is equal to the distance from the third antenna 3 to the second antenna 2.

Just like in the first example embodiment, when viewed in the XY plane, the feeding point 11 of the first antenna 1 and the feeding point 12 of the second antenna 2 correspond to each other. When viewed in the YZ plane, the feeding point 13 of the third antenna 3 and the feeding point 14 of the fourth antenna 4 correspond to each other. Thus, the feeding point 13 of the third antenna 3 and the feeding point 14 of the fourth antenna 4 are placed at positions that are mirror images of each other.

The first antenna 1 and the second antenna 2 are used for V polarization, and the third antenna 3 and the fourth antenna 4 are used for H polarization. A transmission signal of the first antenna 1 and a transmission signal of the second antenna 2 are in phase by the positional relationship between the feeding point 11 and the feeding point 12. By combining a received signal of the third antenna 3 and a received signal of the fourth antenna 4 in opposite phase, the interference components are cancelled. Further, a transmission signal of the third antenna 3 and a transmission signal of the fourth antenna 4 are opposite phase by the positional relationship between the feeding point 13 and the feeding point 14. Thus, by combining a received signal of the first antenna 1 and a received signal of the second antenna 2 in phase, the interference components are cancelled.

In the structure of this example embodiment, the same effects as in the first example embodiment are obtained.

Other Example Embodiment

Figure 9:
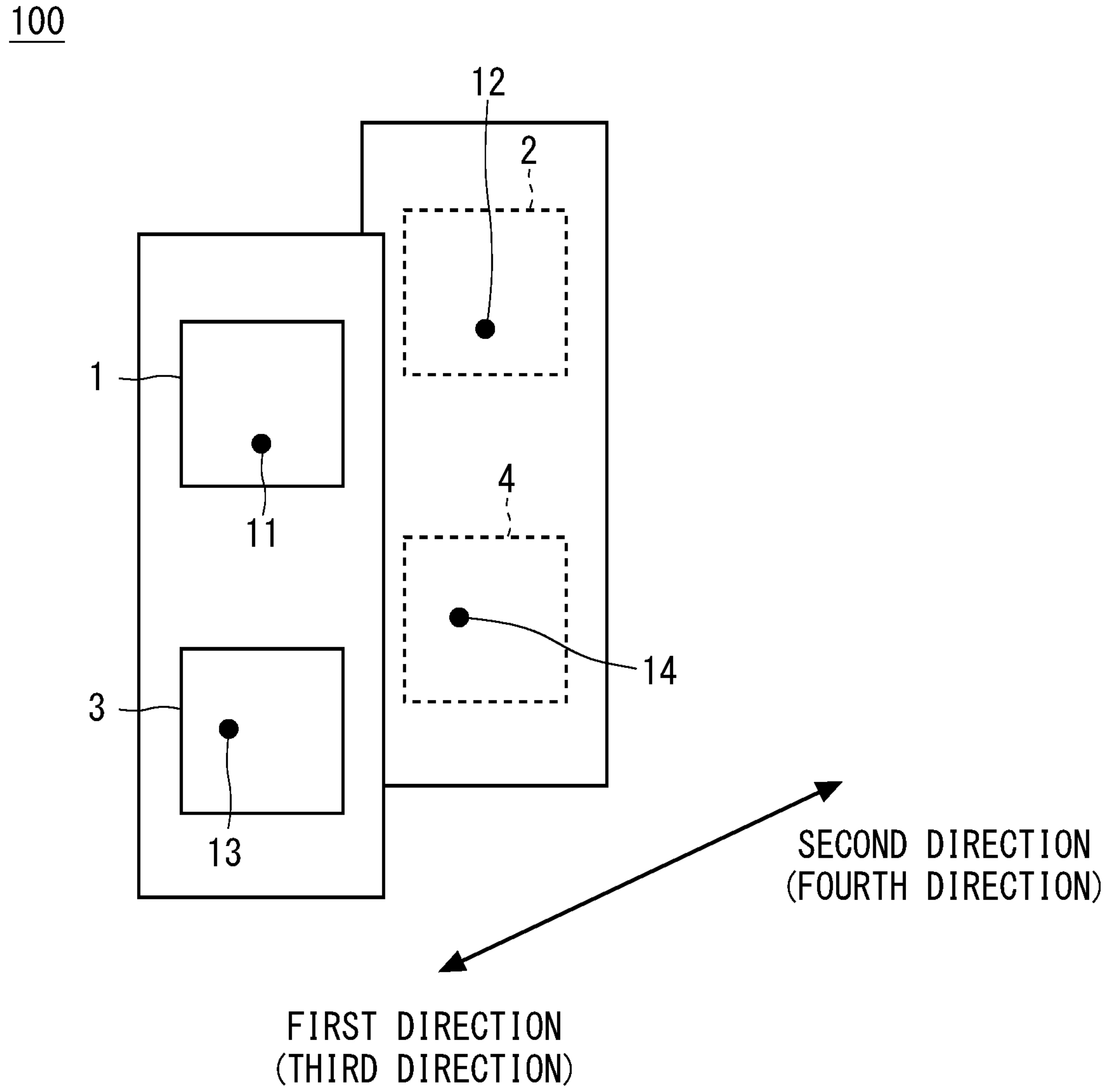
FIG. 9 is a view schematically showing the structure of an antenna device according to another example embodiment.

An antenna device 100 according to another example embodiment is described hereinafter with reference to FIG. 9. Note that description that is redundant with the above description of the first example embodiment is omitted as appropriate. The antenna device 100 includes a first antenna 1, a second antenna 2, a third antenna 3, a fourth antenna 4.

The first antenna 1 is a first directional antenna that is oriented in a first direction and transmits and receives a signal with a first polarization. The second antenna 2 is a second directional antenna that is oriented in a second direction, which is opposite to the first direction, and transmits and receives a signal with the first polarization. The third antenna 3 is a third directional antenna that is oriented in a third direction, which is a direction obtained by horizontally rotating the second direction by 90° or 180°, and transmits and receives a signal with a second polarization orthogonal to the first polarization. The fourth antenna 4 is a fourth directional antenna that is oriented in a fourth direction, which is opposite to the third direction, and transmits and receives a signal with the second polarization. The first antenna 1 is provided with a feeding point 11 (first feeding point). The second antenna 2 is provided with a feeding point 12 (second feeding point) that is placed in phase with the feeding point 11. The third antenna 3 is provided with a feeding point 13 (third feeding point). The fourth antenna 4 is provided with a feeding point 14 (fourth feeding point) that is placed in opposite phase to the feeding point 13.

Although the present disclosure is described above with reference to the example embodiments, the present disclosure is not limited to the above-described example embodiments. Various changes and modifications as would be obvious to one skilled in the art may be made to the structure and the details of the present disclosure without departing from the scope of the disclosure.

This application is based upon and claims the benefit of priority from Japanese patent application No. 2018-232935, filed on Dec. 12, 2018, the disclosure of which is incorporated herein in its entirety by reference.

REFERENCE SIGNS LIST

100 ANTENNA DEVICE
1 FIRST ANTENNA
2 SECOND ANTENNA
3 THIRD ANTENNA
4 FOURTH ANTENNA
5 FIFTH ANTENNA
6 SIXTH ANTENNA
7 SEVENTH ANTENNA
8 EIGHTH ANTENNA
11 TO 18 FEEDING POINT
51 IN-PHASE DISTRIBUTION CIRCUIT
52 OPPOSITE-PHASE COMBINATION CIRCUIT
53 TRANSMITTING CIRCUIT
54 RECEIVING CIRCUIT
111 DIELECTRIC SUBSTRATE
112 FRONT CONDUCTOR
113 BACK CONDUCTOR
114 FEEDER
115 CONNECTOR

What is claimed is:

1. An antenna device comprising:

a first directional antenna oriented in a first direction and configured to transmit and receive a signal with a first polarization;

a second directional antenna oriented in a second direction opposite to the first direction and configured to transmit and receive a signal with the first polarization;

a third directional antenna oriented in a third direction obtained by horizontally rotating the second direction by 90° or 180° and configured to transmit and receive a signal with a second polarization orthogonal to the first polarization;

a fourth directional antenna oriented in a fourth direction opposite to the third direction and configured to transmit and receive a signal with the second polarization;

a first feeding point provided in the first directional antenna;

a second feeding point provided in the second directional antenna and placed in phase with the first feeding point;

a third feeding point provided in the third directional antenna;

a fourth feeding point provided in the fourth directional antenna and placed in opposite phase to the third feeding point, wherein the first directional antenna, the second directional antenna, the third directional antenna, and the fourth directional antenna are patch antennas, the first feeding point and the second feeding point are placed so as to overlap each other when viewed in a plan view from an antenna surface side of the first directional antenna, and the third feeding point and the fourth feeding point are placed so as to overlap each other when viewed in a plan view from an antenna surface side of the third directional antenna, the first directional antenna and the second directional antenna are placed opposite to each other and facing in opposite directions, the third directional antenna and the fourth directional antenna are placed opposite to each other and facing in opposite directions, and the antenna device includes an opposite-phase combination circuit configured to combine a received signal received by the third directional antenna and a received signal received by the fourth directional antenna in opposite phases.

2. A communication method comprising:

a step of performing one of transmission and reception by using a first directional antenna provided with a first feeding point and a second directional antenna provided with a second feeding point;

a step of performing another one of transmission and reception by using a third directional antenna provided with a third feeding point and a fourth directional antenna provided with a fourth feeding point; and wherein the first directional antenna and the second directional antenna transmit and receive a signal with a first polarization, the third directional antenna and the fourth directional antenna transmit and receive a signal with a second polarization orthogonal to the first polarization, the first directional antenna is oriented in a first direction, the second directional antenna is oriented in a second direction opposite to the first direction, the third directional antenna is oriented in a third direction obtained by horizontally rotating the second direction by 90° or 180°, the fourth directional antenna is oriented in a fourth direction opposite to the third direction, the first feeding point and the second feeding point are placed in phase with each other, the third feeding point and the fourth feeding point are placed in opposite phase to each other, the first directional antenna, the second directional antenna, the third directional antenna, and the fourth directional antenna are patch antennas, the first feeding point and the second feeding point are placed so as to overlap each other when viewed in a plan view from an antenna surface side of the first directional antenna, the third feeding point and the fourth feeding point are placed so as to overlap each other when viewed in a plan view from an antenna surface side of the third directional antenna, the first directional antenna and the second directional antenna are placed opposite to each other and facing in opposite directions, and the third directional antenna and the fourth directional antenna are placed opposite to each other and facing in opposite directions, the method further includes a step of combining a received signal received by the third directional antenna and a received signal received by the fourth directional antenna in opposite phases.

* * * * *